US006210099B1

(12) United States Patent
Hugbart et al.

(10) Patent No.: US 6,210,099 B1
(45) Date of Patent: Apr. 3, 2001

(54) MOVING-WEIGHT, DYNAMIC BALANCING APPARATUS FOR A ROTARY MACHINE, IN PARTICULAR FOR INDUSTRIAL FANS

(75) Inventors: Jean-Paul Hugbart, Rully; Alain F. E. Godichon, Saint-Remy, both of (FR); Gianni Trionfetti, Agrate Brianza (IT)

(73) Assignees: ABB Solyvent-Ventec (FR); Balance Systems (IT)

( * ) Notice: Subject to any disclaimer, the term of this patent is extended or adjusted under 35 U.S.C. 154(b) by 0 days.

(21) Appl. No.: 08/949,712

(22) Filed: Oct. 14, 1997

(30) Foreign Application Priority Data

Oct. 21, 1996 (FR) .................................................. 96 12998

(51) Int. Cl.$^7$ ..................................................... F04D 29/66
(52) U.S. Cl. ............................... 415/13; 415/119; 416/31; 416/145; 416/500; 74/573 R; 73/469; 73/470; 73/485
(58) Field of Search ................................. 416/500, 144, 416/145, 31, 35; 415/13, 119; 74/573 R; 451/343; 73/469, 470, 485; 364/528.14

(56) References Cited

U.S. PATENT DOCUMENTS

| 3,149,502 |   | 9/1964  | Caruso et al. |          |
|-----------|---|---------|---------------|----------|
| 3,177,738 | * | 4/1965  | Achilles      | 74/573 R |
| 3,371,450 | * | 3/1968  | Board, Jr. et al. | 74/573 R |
| 3,698,263 | * | 10/1972 | Ito           | 74/573 R |
| 3,827,193 | * | 8/1974  | Liebmann et al. | 74/573 R |
| 3,918,326 |   | 11/1975 | Kida et al.   |          |
| 3,952,612 |   | 4/1976  | Kurkowski et al. |       |
| 3,974,700 | * | 8/1976  | Webb          | 74/573 R |
| 4,117,742 | * | 10/1978 | Stein         | 74/573 R |
| 4,697,607 |   | 10/1987 | Aalto et al.  |          |
| 4,926,341 |   | 5/1990  | Guyot .       |          |
| 5,099,430 | * | 3/1992  | Hirsch        | 73/469   |
| 5,243,788 | * | 9/1993  | Rossmann et al. | 73/462 |
| 5,549,019 | * | 8/1996  | Cattani       | 74/573 R |
| 5,676,025 | * | 10/1997 | Lulay         | 74/573 R |

FOREIGN PATENT DOCUMENTS

| 0 460 282  | 12/1991 | (EP) . |
| 1215606    | 4/1960  | (FR) . |
| 0 657 727  | 6/1995  | (FR) . |
| WO 96/03541 | 2/1996 | (WO) . |

* cited by examiner

*Primary Examiner*—Christopher Verdier
(74) *Attorney, Agent, or Firm*—Nixon & Vanderhye P.C.

(57) ABSTRACT

A moving-weight, dynamic balancing apparatus for a rotary machine, in particular an industrial fan, having a rotary shaft, and at least one rotor carried by the rotary shaft and provided with main rotor bearings to allow rotary movement thereof. The balancing apparatus includes at least one moving-weight balancing unit is carried by the rotary shaft, and at least one monitoring and correcting system having a drive assembly. The at least one monitoring and correcting system monitors and corrects the unbalanced state of the rotor, and acts continuously on the at least one moving-weight balancing unit when the rotor is rotating to monitor and correct for rotor unbalance. The at least one moving-weight balancing unit has at least two balancing masses mounted to be movable under drive from the drive assembly controlled by the monitoring and correction system. The at least one moving-weight balancing unit is situated axially at a distance from the rotor to be balanced beyond the main rotor bearings, and includes a ring and at least one guide assembly. The at least two balancing masses include respective carriages that are moveable in the ring, guided by the at least one guide assembly, independently of each other along trajectories that form closed circuits around the rotary shaft under drive from the drive assembly associated with each of said at least two balancing masses.

23 Claims, 7 Drawing Sheets

MOVING-WEIGHT, DYNAMIC BALANCING APPARATUS FOR A ROTARY MACHINE, IN PARTICULAR FOR INDUSTRIAL FANS

FIELD OF THE INVENTION

The present invention relates to the general technical field of moving-weight, dynamic balancing apparatuses for rotary machines, in particularly for turbo-machines such as industrial fans.

The present invention relates to moving-weight, dynamic balancing apparatus for a rotary machine, in particularly an industrial fan, the machine including at least one rotor carried by a rotary shaft, the apparatus having at least one moving-weight balancing unit carried by said shaft and situated axially at a distance from the rotor to be balanced, and at least one system for monitoring and correcting the unbalanced state of the rotor, said system being suitable for acting continuously on the balancing unit(s) when the rotor is rotating to monitor and correct rotor unbalance, the one moving-weight balancing unit comprising at least two balancing masses mounted to be movable under drive from drive means controlled by the monitoring and correction system.

The present invention also relates to an industrial fan fitted with moving-weight, dynamic balancing apparatus of the invention, and more generally to turbo-machines such as steam turbines, compressors, and regardless of the fluid involved in the operation of the turbo-machine, it being understood that the balancing apparatus of the invention is particularly, although not exclusively, applicable to turbo-machines requiring a large amount of balancing capacity, substantially of the order of at least 100,000 gram-millimeters (g·mm), and preferably in the range 100,000 g·mm to 5,000,000 g·mm.

BACKGROUND OF THE INVENTION

One of the major problems of large capacity turbo-machines as described above relates to the vibration that such machines can generate, in particular at the bearings. In most cases, the origins of such vibration stem from rotor unbalance. For industrial fans of large capacity, e.g. of the order of 100 kW to 10,000 kW, their normal operating conditions necessarily imply that an unbalanced state of the rotor appears gradually or suddenly.

Such appliances are designed to provide ventilation in industrial fields as varied as the nuclear industry, the chemical industry, iron and steel works, cement making, or indeed in fossil fuel power stations.

Consequently they are commonly exposed to the risk of particles or blown matter being deposited on or by the blades of the fan, to progressive wear of the blades of the fan due to the various corrosion effects of the fluids or gases passing through the fan, or indeed to deformation due to sudden temperature variations.

The deposition of matter (clogging) on the blades of the fan also generally takes place in gradual and non-uniform manner on the various blades of the fan, thereby giving rise to a first rotor-unbalancing effect. In certain applications, for example in cement works, this first rotor-unbalancing effect can be accompanied by a second unbalancing phenomenon that is much more sudden, being caused by one or more blocks of material that were previously stuck to the blades becoming detached therefrom suddenly. This second phenomenon gives rise to large and violent unbalance of the rotor which is particularly dangerous for large-capacity appliances in which blade diameter can easily be three meters (m) and the speed of rotation at least 1000 revolutions per minute (rpm).

For all of the situating mentioned above by way of non-limiting example, the appearance of vibration well above the operating limit of an appliance means that the fan must be brought to rest quickly, and consequently that all or part of an industrial or production facility must also be stopped while the blades are being cleaned or the rotor is being balanced. In addition, the operations of cleaning or rebalancing the rotor are lengthly and particularly difficult. Industrially and economically speaking, the downtime of the fan represents a large expense that is difficult to accept.

There is thus a great need for a solution that is practical, effective, and quick to the above-mentioned problems of turbo-machines such as industrial fans.

Proposals have already been made to implement moving-weight, dynamic balancing apparatus for an industrial fan that is capable of continuously and automatically monitoring the unbalance/balance state of the fan in operation, and also of continuously performing the necessary balance-correcting operations. Such apparatus makes use of at least one balancing unit, specifically a ring, that is carried by the shaft supporting the rotor, i.e. the fan wheel. The balancing ring includes, as balancing means, a high density fluid capable of vaporizing quickly in contact with heater devices installed in the fluid flow circuit. The system for monitoring and correcting the unbalance state of the rotor includes a microprocessor, measures the level of fan vibration, and determines the location of the unbalance.

The monitoring and correction system then feeds electricity to the heater device situated in the vicinity of the place where the unbalance has been found, so as to cause the fluid situated in this zone to be vaporized. Under such circumstances, the vaporized fluid is transferred into a cooling chamber situated in an opposite zone where it recondenses and thus returns to its initial liquid state. This fluid transfer phenomenon serves to balance the rotor.

Such apparatus provides a genuine contribution to controlling rotor unbalance, however it nevertheless suffers from a certain number of drawbacks associated in particular with the impossibility of avoiding the particularly tough and extreme operating conditions in which industrial fans must necessarily operate. Thus, the extreme temperature variation conditions to which industrial fans are subject can have a negative effect on the accuracy with which balancing or rebalancing of industrial fan rotors is performed when balancing is done by means of fluid vaporization/condensation. Also, since the correction of fan unbalance relies on transferring fluid from a hot point to a condensation cold point, the accuracy with which such apparatus can be controlled is limited because of the similarly limited number of cooling chambers around the periphery of the ring. In other words, rotor rebalancing is performed at discrete balancing zones at the periphery of the balancing ring, and not at any point chosen continuously around the entire periphery of the ring, thereby leading to relatively inaccurate balancing.

Finally, it should be observed that a balancing system making use of a fluid circuit is relatively fragile since the circuit must be perfectly fluid-tight even though the usual operating conditions of industrial fans imply that ambient conditions are particularly difficult and corrosive. It also turns out that the balancing capacity of fluid systems is limited to industrial fans of small capacity.

In a technical field different from that of industrial fans, and specifically for machines requiring small balancing capacity, namely grinding machines, it is already known to use balancing rings and an unbalance detection system which includes a microprocessor controlling the displacement of the rings. In that system, the balancing unit is internally mounted inside the body itself of the grinding wheel. Such solutions are not suitable for balancing large masses or for operating in difficult environmental conditions.

OBJECTS AND SUMMARY OF THE INVENTION

The object of the invention is consequently to remedy the above-specified drawbacks, and to propose novel, moving-weight, dynamic balancing apparatus for rotary machines in which correction force control can be performed accurately.

Another object of the invention seeks to propose novel balancing apparatus that is particularly simple to implement in terms of extra equipment, and that can be done at low cost.

Another object of the invention is to propose novel balancing apparatus capable of being relatively insensitive to ambient conditions, and capable of balancing rotors with good accuracy under extreme conditions.

A further object of the invention is to propose novel balancing apparatus capable of balancing rotors of large mass both quickly and reliably.

The objects of the invention are achieved by moving-weight, dynamic balancing apparatus for a rotary machine, in particular an industrial fan, the machine including at least one rotor carried by a rotary shaft, the apparatus having at least one moving-weight balancing unit carried by said shaft, and at least one system for monitoring and correcting the unbalanced state of the rotor, said system being suitable for acting continuously on the balancing unit(s) when the rotor is rotating to monitor and correct rotor unbalance, the moving-weight balancing unit comprising at least two balancing masses mounted to be movable under drive from drive means controlled by the monitoring and correction system, wherein the balancing unit is situated axially at a distance form the rotor to be balanced, and is formed by a ring in which the balancing masses move independently on each other along trajectories that form closed circuits around the rotary shaft under drive from the drive means associated with each mass, being guided in at least one guide means.

BRIEF DESCRIPTION OF THE DRAWINGS

Other details and advantages of the invention are described in greater detail in the light of the following description and illustrative examples, given purely as non-limiting examples, and in which.

MORE DETAILED DESCRIPTION

Figure 1:
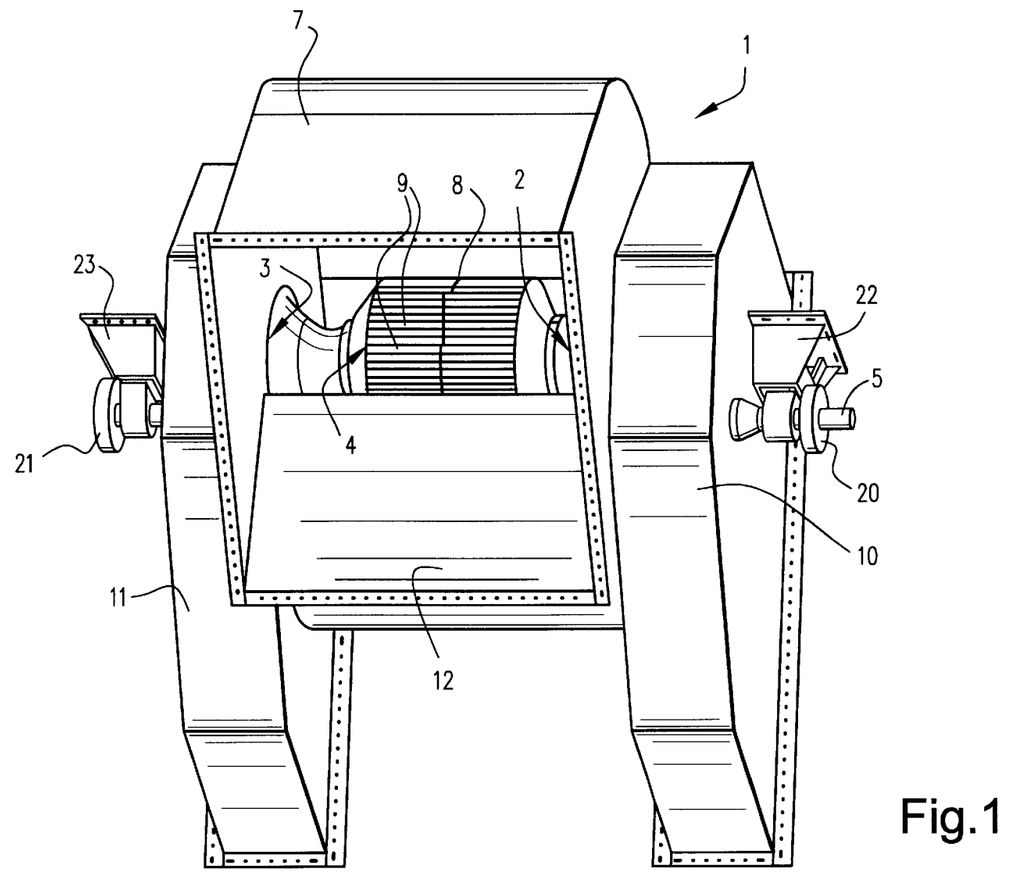
FIG. 1 is an overall perspective view of an industrial fan fitted with balancing apparatus of the invention.

FIG. 1 is a general perspective view of an industrial fan of the dual-flow centrifugal type having at least two fluid inlets 2, 3 disposed on either side of a fan wheel 4 which is mounted and supported in rotation on a rotary shaft 5 itself suitable for being rotated by means of a drive device (FIG. 2) such as an electric motor 9, for example. The fan wheel 4 forming the rotor is mounted in a structure provided with an outer cowling 7 and including, in conventional manner, a central disk 8 which may be notched and whose lateral faces are provided with a series of vanes 9 covered by plates of varying profile in a manner appropriate to the type of centrifugal fan and to the characteristics of the fluid to be blown.

There are generally two inlets 2, 3 and they form the suction units of the centrifugal fan 1.

At the suction units, the centrifugal fans 1 are preferably fitted with flow regulation systems disposed upstream from the fan wheel and disposed in suction chambers 10, 11 associated with each of the inlets 2, 3, respectively. In conventional manner, the suction chambers 10, 11 contain respective series of blades or deflector elements for deflecting the direction and the path followed by the fluid so as to considerably improve the efficiency of the fan. Such devices are well known in the prior art and are consequently not described in greater detail.

The industrial fan 1 also includes, in conventional manner, a delivery outlet 12.

In the example below, the moving-weight, dynamic balancing apparatus of the invention is described in a preferred application where it constitutes equipment for an industrial fan 1, it being understood that the description is not limiting in any way and the apparatus can be applied to any type of rotary machine carried by a rotary shaft.

Figure 2:
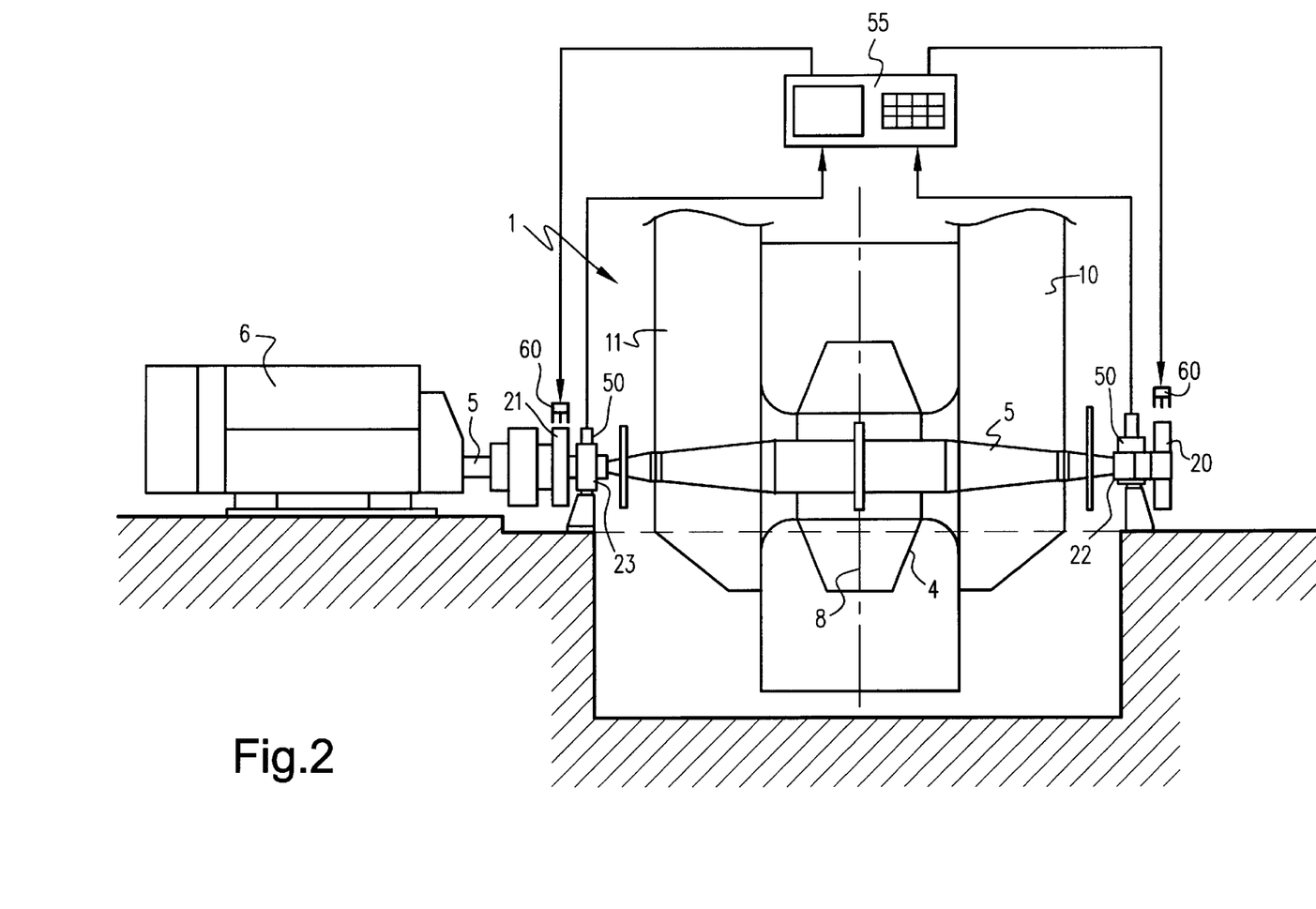
FIG. 2 is a plan view of the main elements constituting balancing apparatus of the invention and fitted to an industrial fan.

In the preferred embodiment shown in FIGS. 1 and 2, the fan 1 is fitted with two moving-weight balancing units 20, 21 disposed outside the rotor and carried by the rotary shaft 5 while rotating together therewith. Advantageously, the balancing units 20 and 21 are situated axially on either side of the rotor at distances therefrom that are preferably equal, and beyond the main bearings 22, 23 of the rotor, going away from the position of the rotor. Under such circumstances, the balancing units 20 and 21 are situated in the vicinity of the bearings 22, 23, with such a disposition making it possible to reduce the mechanical forces on the rotary shaft 5 and thus to make it of smaller diameter. Clearly, in a variant, it would be possible to place the balancing units 20 and 21 closer to the rotor that is to be balanced, e.g. between said rotor and the bearings 22, 23, and, either both on the same side of the rotor or else each on opposite sides of the rotor.

Similarly, in a variant, it is possible to envisage mounting only one moving-weight balancing unit outside the rotor, in one or the other of the above-described positions, e.g. for a fan having a single inlet.

Figure 3:
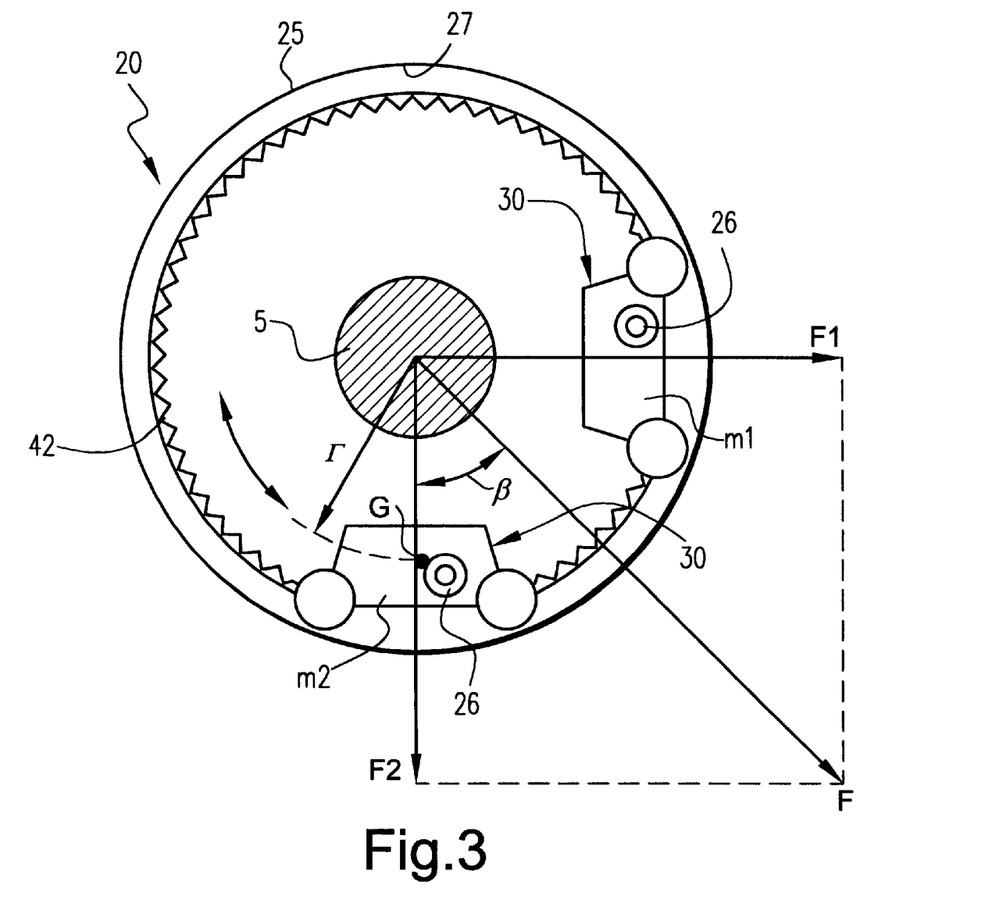
FIG. 3 is a section view of a balancing ring in a preferred variant of the invention.
Figure 4:
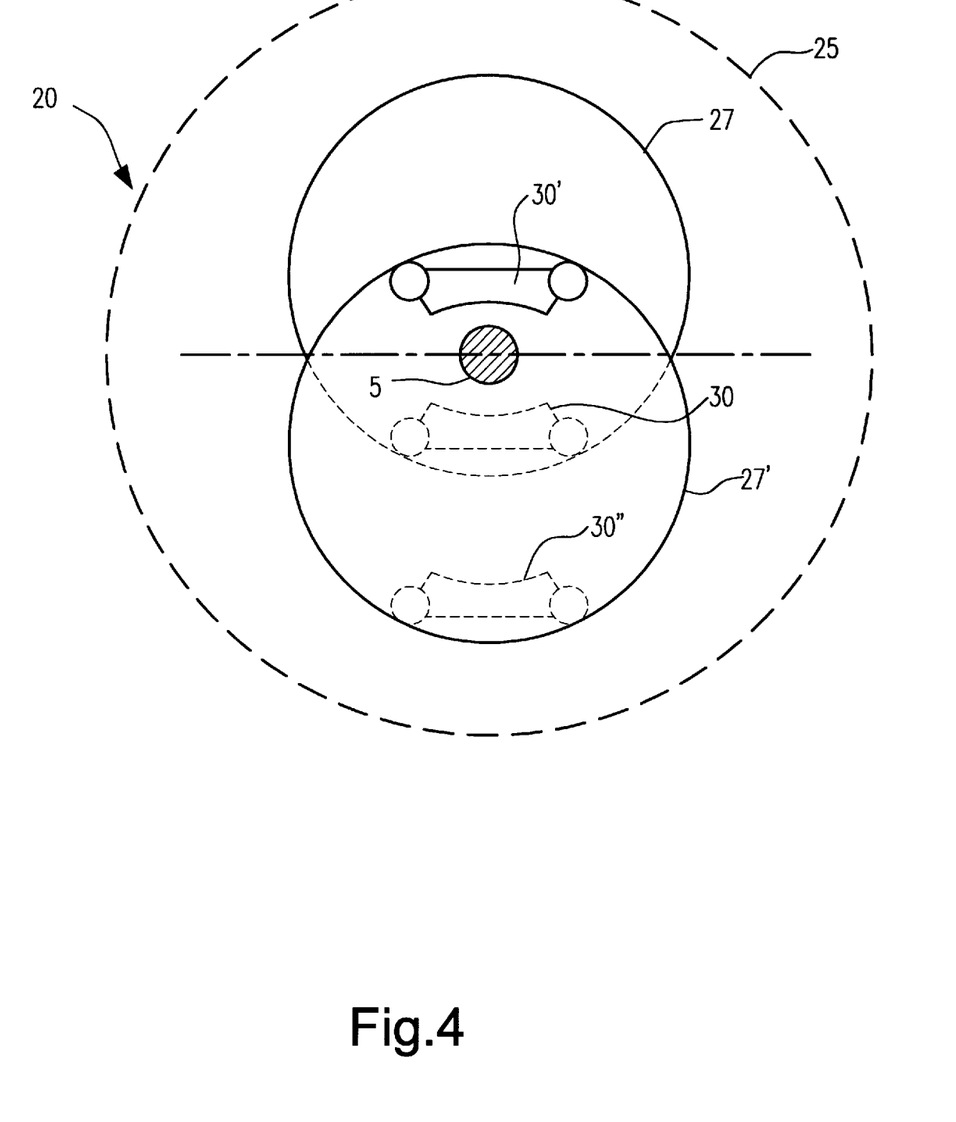
FIG. 4 shows an embodiment detail of a second variant of a balancing ring of the invention.
Figure 4A:
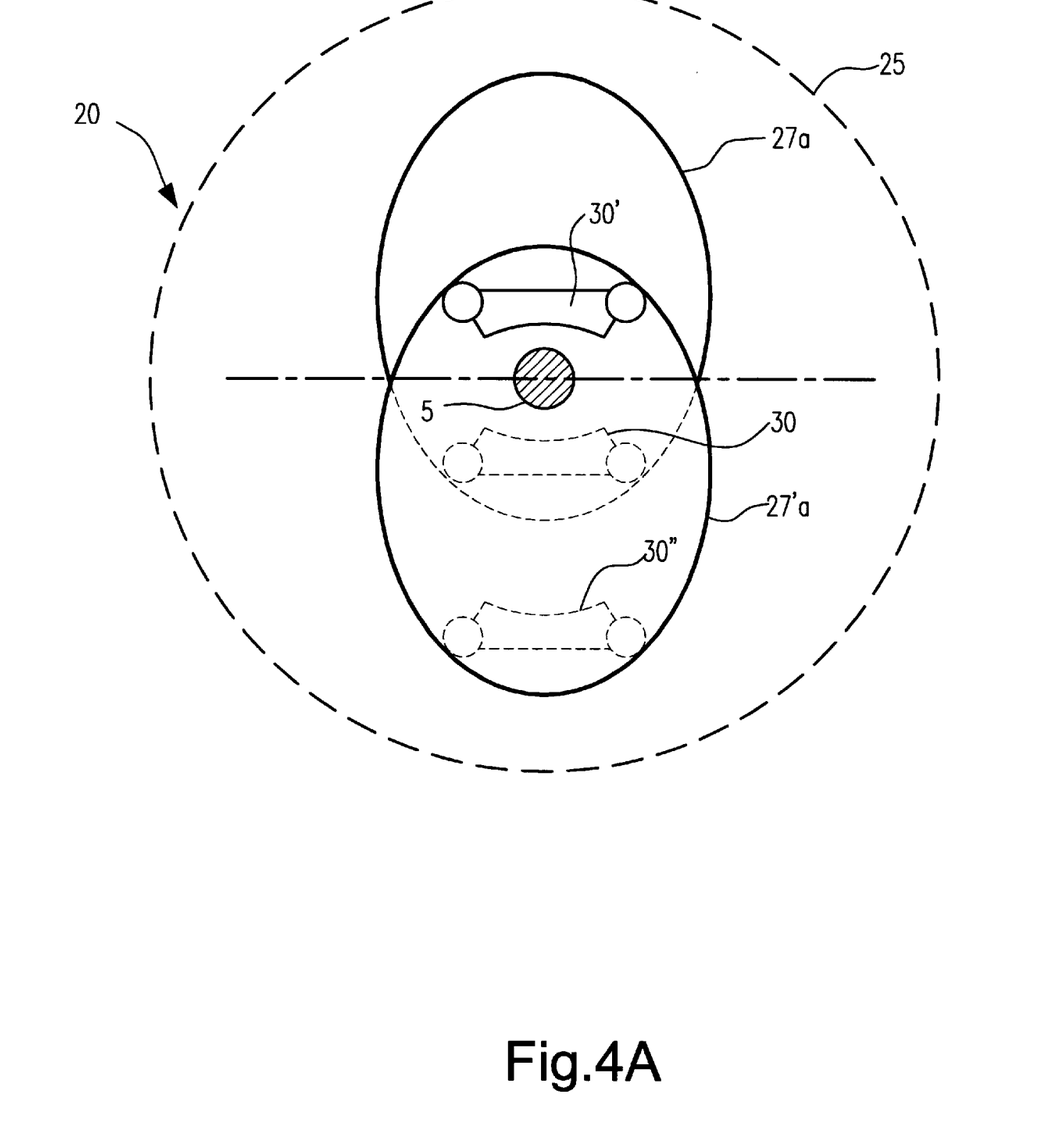
FIG. 4a is an embodiment similar to that shown in FIG. 4, but with elliptical running tracks.

Advantageously, the balancing unit(s) 20, 21 is/are in the form of a ring 25 provided, as shown in FIGS. 3 and 4, with an outer protective body in which at least two balancing masses m1 and m2 in the solid state and of fixed and defined shape are mounted to be movable independently of each other under drive from drive means 26. In the embodiment shown in FIG. 3, the balancing masses m1 and m2 move under drive from drive means 26 such as respective micromotors associated with each of the masses and under guidance provided by at least one guide means 27 formed by a running track covering, directly or otherwise, the internal periphery of the ring 25. The balancing masses m1 and m2 are advantageously constituted by carriages 30 each including a series of wheels 31 suitable for being guided in or on the guide means 27. In a different variant, each carriage 30 could be provided with skids.

Consequently the balancing masses m1 and m2 move along trajectories that form a closed circuit around the rotary shaft 5, which trajectory is substantially circular in the present case, with the relative angular positions of the carriages 30 being independently adjustable in both circular directions by means of the respective micro-motors 26.

By way of indication, the average mass of each carriage 30 is of the order of 2 kg to 5 kg, and naturally it can vary as a function of the balancing capacity required by the mass of the rotor that is to be balanced. Advantageously, the carriages 30 are of identical mass. It will be understood that depending on the relative angular positions of the carriages 30, the resultant of the forces F1 and F2 exerted by the masses of the two carriages 30 is a resultant force F ($F=2m\omega^2 r \cdot \cos\beta$) for correcting rotor unbalance and acting on the rotary shaft 5. In the above equation:

m=the mass of each carriage;
r=the distance of the center of gravity G of each carriage 26 from the axis of the rotary shaft;
$\omega^2$=the square of the angular velocity of the shaft; and
$\beta$=the angular position of each carriage relative to the resultant force F.

When balancing in this way, the resultant balancing force F is zero when the two carriages are diametrically opposite each other and at a maximum when they are vertically side by side.

Figure 5:
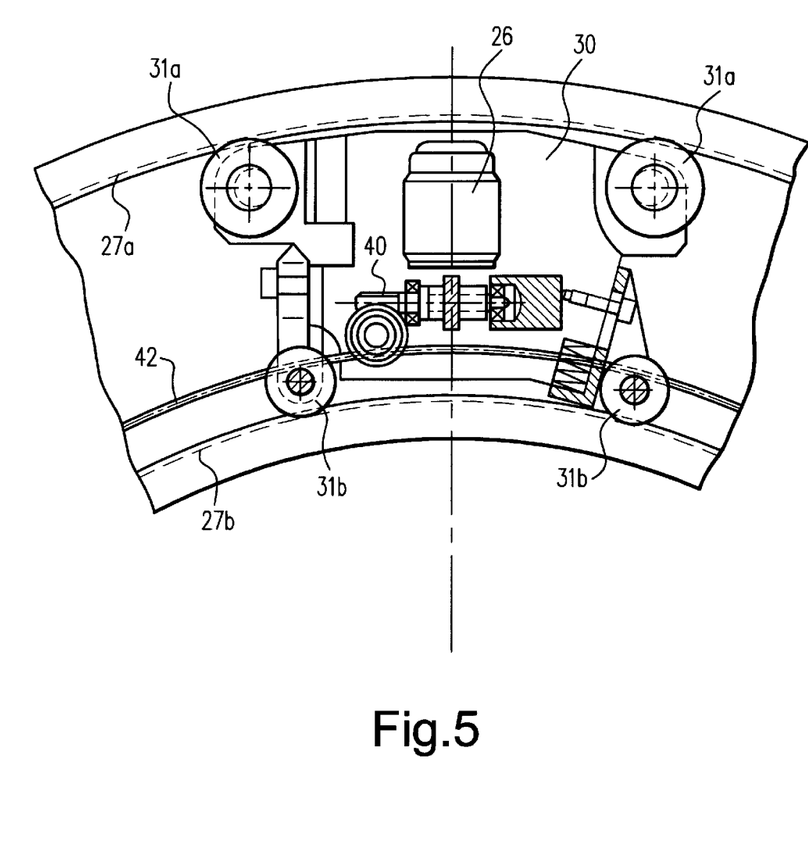
FIG. 5 is a fragmentary plan view of a balancing ring showing details of the implementation of a balancing carriage of the invention.
Figure 6:
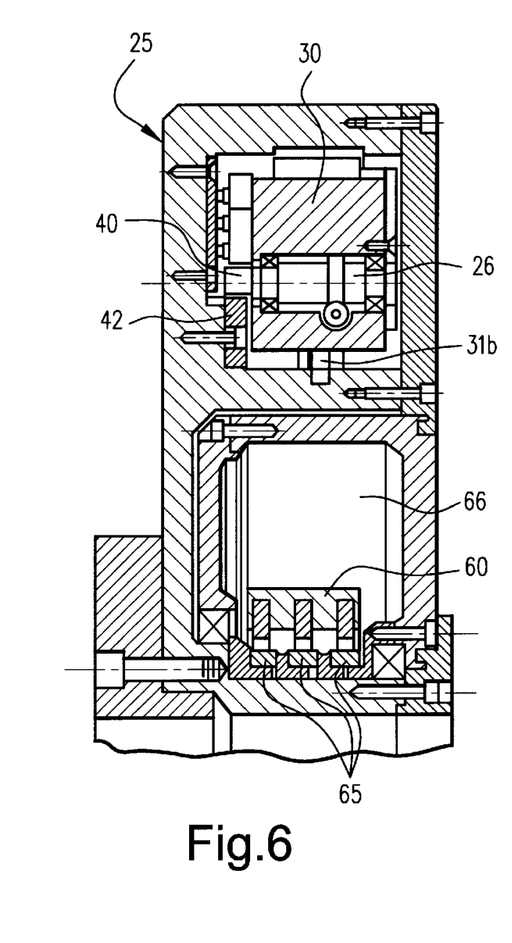
FIG. 6 is a cross-section through a balancing ring on a plane containing its axis, showing implementation details of balancing carriages and how they move within the balancing ring.

FIGS. 5 and 6 show structural details of the carriages 30 and of the balancing ring 25. The carriages 30 preferably have internal wheels 31b, e.g. a pair of internal wheels, and external wheels 31a, e.g. likewise a pair ("internal" and "external" being relative to the center of the ring 25), with each pair of wheels 31a, 31b being associated with a respective running track that constitutes an outer track 27a or an inner track 27b.

In this preferred embodiment, the ring 25 thus has two running tracks advantageously made of a material or covering that is capable of withstanding very large accelerations without deforming.

The micro-motor 26 housed in each carriage 30 is functionally connected to a system 55 for monitoring and correcting the unbalanced state of the rotor, and is provided with a force transmission member 40 such as a wormscrew meshing directly or indirectly with a rack 42 concentric with the running tracks 27a and 27b for angularly displacing the balance masses m1 and m2.

Various other embodiments can be envisaged without thereby going beyond the ambit of the invention. Thus, it is possible to make balancing units 20 and 21 in which the running tracks 27 are not circular, but that are formed by trajectories which are substantially elliptical, for example, as shown by the chain lines in FIG. 4. In general, each balancing ring 25 has at least two carriages 30 which are preferably of a mass that is identical both within each of the balancing rings 25, and also between the balancing rings 25. Nevertheless, it is possible to increase the number of carriages 30 per balancing ring and to have masses that are not identical either within each balancing ring 25 or between the balancing rings.

Nor is it essential, as in the embodiment shown in FIG. 5, for the pair of carriages 30 to move on or in the same running track 27. Thus, the embodiment shown in FIG. 4 shows an embodiment in which each carriage 30 making up the pair of balancing masses moves along a different running track, which tracks are preferably situated in different axial planes that are parallel to each other. In the variant shown in FIG. 4, each carriage 30 follows a circular trajectory but varies its distance from the rotary shaft 5 since the trajectories are not centered on the axis of rotation of the shaft 5. Thus, in FIG. 4, the carriage 30' that moves on running track 27' is shown as occupying a second position 30", while on track 27 the carriage 30 is shown as occupying a position that is close to and symmetrically opposite from the position of the carriage 30' relative to the rotary shaft 5.

This embodiment has the advantage of making it possible to put the carriages 30' and 30 in angular positions such that their mean relative distance is smaller than in the variant having a single running track. Having the carriages 30' and 30 in the closer-in positions is particularly advantageous when putting the rotor into operation while it is in a properly balanced state, since the closer-in position makes it possible to perform balancing corrections of small size and with small forces being applied to the mechanical structure in comparison with single-track embodiments. This makes it possible to reduce the forces applied to the parts making up the balancing units 20 and 21, thereby contributing to lengthening the lifetime of the various components, and in particular the lifetime of the running tracks 27.

Figure 7:
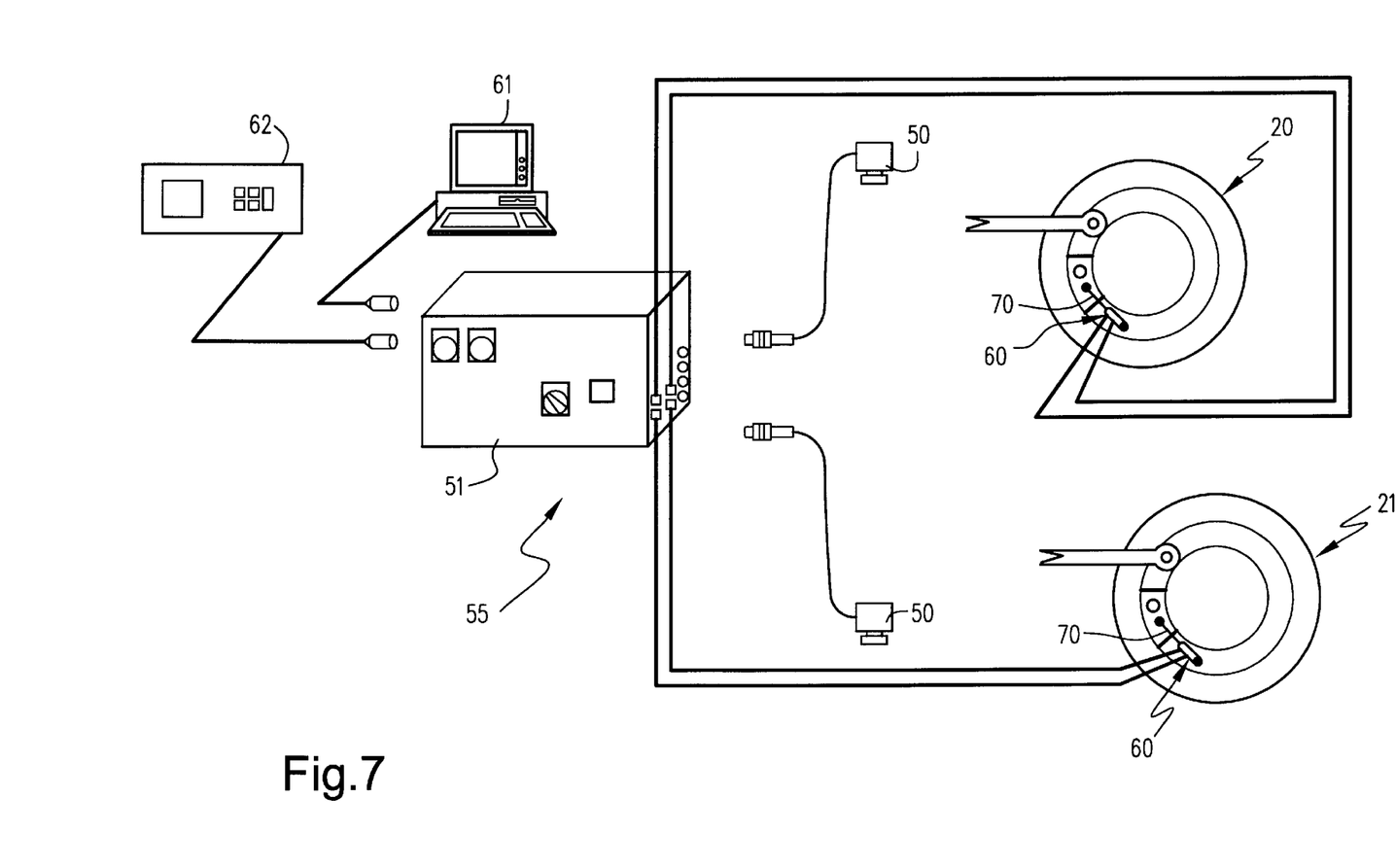
FIG. 7 is a diagram showing all of the elements making up the balancing apparatus of the invention.

The balancing unit(s) 20, 21 is/are under the control of a system 55 for monitoring and correcting the unbalance state as shown diagrammatically in FIG. 7, with the main function of the system being to evaluate the unbalanced/balanced state of the rotor, i.e. of the fan wheel 4, and to proceed, preferably automatically, with the necessary corrections by controlling and driving the equilibrium masses m1 and m2. Preferably, such a system comprises:

at least one sensor of a value that is representative of the unbalanced state of the rotor;
a microprocessor serving firstly to evaluate on a continuous basis the unbalanced state of the rotor by comparing the measured values as continuously transmitted from the sensor(s) with previously-recorded reference values, and secondly, if the comparison shows up an unbalanced state, to control and drive at least one of the balancing masses m1, m2 until it moves into a position in which the rotor is fully balanced; and
an electromechanical interface between the sensor(s), the microprocessor, and the means for driving the balancing masses m1, m2.

The system 55 for monitoring and correcting the unbalanced state advantageously includes at least one vibration sensor 50 (FIGS. 2 and 7) as its sensor, and preferably two such sensors each disposed in the vicinity of one of the balancing units 20, 21 on a main bearing 22 or on the rotary shaft 5. The vibration sensor(s) 50 is/are functionally connected to a microprocessor 51 possessing a computation algorithm and a set of memory registers in which reference data is stored, and also successive vibration measurements, thereby providing a set of reference values for performing the computation algorithm.

As shown in FIGS. 6 and 7, the electromechanical interface includes a contactor 60 mounted in each balancing unit 20, 21, being connected to the microprocessor and being capable of engaging in a rubbing or wiping relationship with contact tracks 65 that are electrically connected to the carriages 30. The contactor 60 may be constituted by a friction ring permanently fixed in the balancing ring 25, and for example in an inner chamber 66 so as to be permanently in contact with the contact tracks 65 during displacement thereof, or it may be mounted movably, e.g. by means of a lever under the control of an actuator 70 (FIG. 7) so as to be put into contact with the tracks 65 only when an unbalanced state of the rotor is detected.

The system 55 for monitoring and correcting the unbalanced state may be connected to a computer 61, e.g. of the PC type, to record and supervise the data provided on a continuous basis by the balance measuring instruments, together with the corrections performed. The system can also be connected to a remote control and monitoring panel 62, e.g. enabling monitoring or operating parameters of the apparatus to be input or modified.

With a preferred example of its computation algorithm, the balancing apparatus of the invention operates as follows.

With the industrial fan in operation, the sensor(s) 50 continuously supplies the microprocessor at regular intervals with a series of measurements of machine vibration. The microprocessor continuously compares the information it receives from the sensors 50 with its own reference data, which data includes a limiting vibration value that must not be exceeded. Once this maximum value has been exceeded, meaning that an unbalanced state has been detected, the microprocessor selects one or the other of the balancing rings 20 and 21 depending on which sensor has detected unbalance. The microprocessor 51 then causes a carriage 30 to be moved in a given direction, with the sensors 50 simultaneously continuing to deliver new instantaneous vibration measurements. The microprocessor 51 continuously compares each new measured vibration value with its own system of references, and is therefore in a position to determine whether the recent displacement of the carriage was or was not suitable for reducing the value of the most recently transmitted vibration measurement. If the most recently transmitted vibration value corresponds to a decrease in vibration state, then the microprocessor continues to cause the carriage 30 to move in the same direction while ensuring that the general level of vibration does indeed decrease. Otherwise, the microprocessor reverses the travel direction of the carriage 30 is the vibration level increase, in spite of the corrections that have been performed. The computation algorithm thus operates recurrently and it is naturally designed so as to optimize reaching a balanced result quickly, with balancing being based on the principle of travelling continuously in a travel direction that reduces vibration level.

Once the measured vibration level reaches a prerecorded minimum value, the automatic balancing procedure is halted.

In another variant, instead of using carriages 30, it is possible to envisage the balancing masses m1 and m2 being constituted by annular balancing pieces that are weighted at some point or have a cutout at some point around their respective circumference. Under such circumstances, the annular balancing pieces are disposed parallel to each other about the rotary shaft 5, and there may be two of them. Displacing them in rotation around the rotary shaft 5 serves to re-balance the rotor. In general, the balancing masses m1, m2 can be constituted by any part that is mounted to move around the rotary shaft 5 and can include weighted arms or levers.

It is not essential to make use of a microprocessor, and simplified systems 55 for monitoring and correcting the unbalance state can suffice, for example systems based on analog circuits and making use of automatic or even manual control for causing the balancing masses m1 and m2 to be moved.

The moving-weight, dynamic balancing apparatus of the invention, and the corresponding balancing method, consequently make it possible, in real time, to control accurately, quickly, and reliably the forces required for correcting unbalance of a machine of large mass. The possibility of rotating the carriages 30 around the entire periphery of the running paths 27 makes it possible, when use in association with a microprocessor, to perform correction of rotor unbalance in a manner that is particularly accurate. The balancing apparatus is also particularly well protected against being attacked by the surrounding environment, thereby contributing to the reliability and the longevity of the apparatus.

What is claimed is:

1. An industrial fan having a rotary shaft, at least one rotor carried by said rotary shaft, main rotor bearings to allow rotary movement of said at least one rotor, and a balancing dynamic balancing apparatus comprising:

at least one moving-weight balancing unit carried by said rotary shaft, and at least one monitoring and correcting system which includes a drive assembly, wherein said at least one monitoring and correcting system monitors and corrects an unbalanced state of the rotor, and acts continuously on said at least one moving-weight balancing unit when the rotor is rotating to monitor and correct rotor unbalance, wherein said at least one moving-weight balancing unit comprises at least two balancing masses mounted to be movable under drive from said drive assembly controlled by said at least one monitoring and correction system, and wherein said at least one moving-weight balancing unit is situated axially at a distance from the rotor to be balanced beyond the main rotor bearings, and includes a ring and at least one guide assembly, and wherein said at least two balancing masses including at least one guide assembly having running tracks defining respective trajectories that form closed circuits around the rotary shaft, and carriages that are movable along a respective one of the running tracks under drive from the drive assembly associated with each of said at least two balancing masses so as to follow said closed circuit independently of one another; and wherein said running tracks include inner and outer running tracks and said carriages include internal and external wheels associated with respective ones of said inner and outer running racks.

2. A moving-weight, dynamic balancing apparatus for a rotary machine having a rotary shaft, at least one rotor carried by said rotary shaft, and main rotor bearings to allow rotary movement of said at least one rotor, the apparatus comprising:

at least one moving-weight balancing unit carried by said rotary shaft, and at least one monitoring and correcting system which includes a drive assembly, wherein said at least one monitoring and correcting system monitors and corrects an unbalanced state of the rotor, and acts continuously on said at least one moving-weight balancing unit when the rotor is rotating to monitor and correct rotor unbalance, wherein said at least one moving-weight balancing unit comprises at least two balancing masses mounted to be movable under drive from said drive assembly controlled by said at least one monitoring and correction system, and wherein said at least one moving-weight balancing unit is situated axially at a distance from the rotor to be balanced beyond the main rotor bearings, and includes a ring and at least one guide assembly, and wherein said at least two balancing masses include at least one guide assembly having running tracks defining respective trajectories that form closed circuits around the rotary shaft, and carriages that are movable along a respective one of the running tracks under drive from the drive assembly associated with each of said at least two balancing masses so as to follow said closed circuit independently of one another; and wherein said running tracks include inner and outer running tracks and said carriages include internal and external wheels associated with respective ones of said inner and outer running racks.

3. Balancing apparatus according to claim 2, including at least two balancing units situated respectively at opposite ends of the rotor to be balanced.

4. Balancing apparatus according to claim 3, wherein the at least two balancing units are each situated beyond the main rotor bearings at equal distances from the rotor to be balanced.

5. Balancing apparatus according to claim 2, wherein the running tracks form substantially circular trajectories around the rotary shaft.

6. Balancing apparatus according to claim 2, wherein the running tracks from substantially elliptical trajectories around the rotary shaft.

7. Balancing apparatus according to claim 2, including at least two carriages of identical mass operatively associated with each respective one of said running tracks.

8. Balancing apparatus according to claim 2, wherein said running tracks are situated in axial planes that are different but parallel with respect to one another.

9. Balancing apparatus according to claim 8, wherein the running tracks are circular, not concentric, about the rotary shaft.

10. Balancing apparatus according to claim 9, wherein the running tracks are circular.

11. Balancing apparatus according to claim 8, wherein the different running tracks are situated in different parallel axial planes.

12. Balancing apparatus according to claim 1, wherein the drive assembly includes a respective micro-motor housed in each balancing mass and functionally connected to the at least one monitoring and correcting system.

13. Balancing apparatus according to claim 12, wherein the running tracks include a concentric rack, and wherein each micro-motor includes a force transmission member meshed with the rack for moving the balancing masses.

14. Balancing apparatus according to claim 1, wherein the at least one monitoring and correcting system comprises:

at least one sensor of a value that is representative of the unbalanced state of the rotor;

a microprocessor serving firstly to evaluate on a continuous basis the unbalanced state of the rotor by comparing measured values as continuously transmitted by the at least one sensor with previously recorded reference values, and secondly, if the result of the comparison reveals an unbalanced state, to control and drive displacement of at least one of the at least two balancing masses until the rotor is fully balanced; and an electromechanical interface between the at least one sensor, the microprocessor, and the drive assembly which drives the at least two balancing masses.

15. Balancing apparatus according to claim 14, wherein said at least one sensor includes at least one vibration sensor disposed in a vicinity of said at least one balancing unit.

16. Balancing apparatus according to claim 14, wherein the electromechanical interface includes a contactor mounted within said at least one balancing unit and electrically connected to the microprocessor and the at least two balancing masses.

17. Balancing apparatus according to claim 16, wherein the electromechanical interface includes contact tracks, and wherein the contactor includes a friction ring that is continuously in contact with the contact tracks.

18. Balancing apparatus according to claim 16, wherein the electromechanical interface includes contact tracks, and wherein the contactor includes a friction ring that is movably mounted to come into intermittent contact with the contact tracks only in response to detection of an unbalanced rotor state.

19. Balancing apparatus according to claim 14, wherein said at least one sensor includes two vibration sensors each disposed in a vicinity of said at least one balancing unit.

20. Balancing apparatus according to claim 19, wherein each of said vibration sensors is disposed on said rotor bearings.

21. Balancing apparatus according to claim 19, wherein each of said vibration sensors is disposed on the rotary shaft.

22. Balancing apparatus according to claim 2, designed and dimensioned so as to perform balancing correction of at least 100,000 g·mm.

23. Balancing apparatus according to claim 1, designed and dimensioned so as to perform balancing correction in an amount within the range 100,000 g·mm to 5,000,000 g·mm.

* * * * *